C. EMMETT.
AUTOMOBILE.
APPLICATION FILED APR. 2, 1918.
1,294,431.
Patented Feb. 18, 1919.
2 SHEETS—SHEET 1.
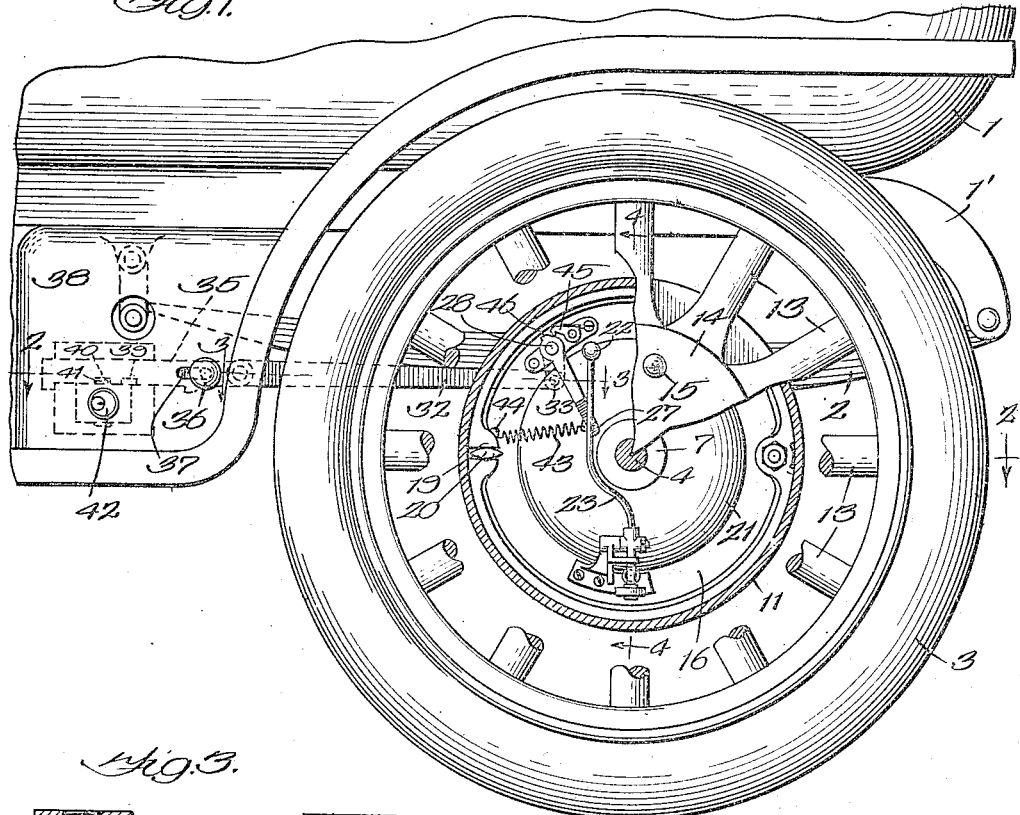
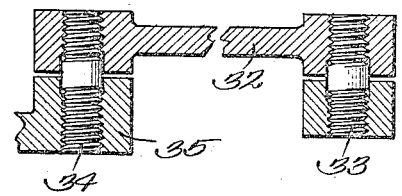
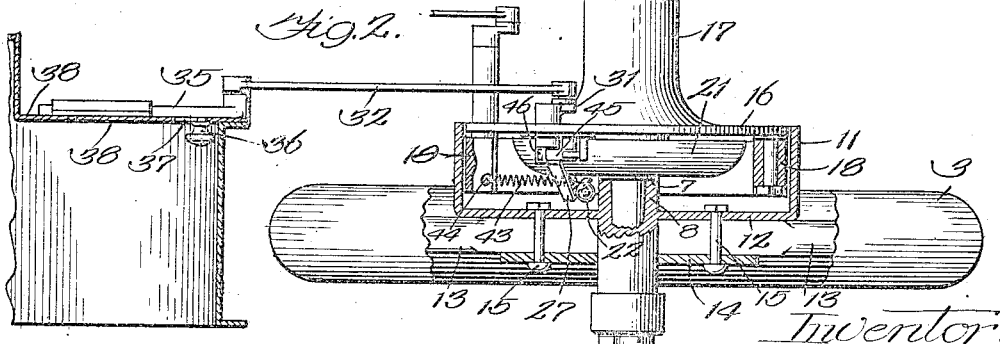
Inventor:
Clem Emmett.

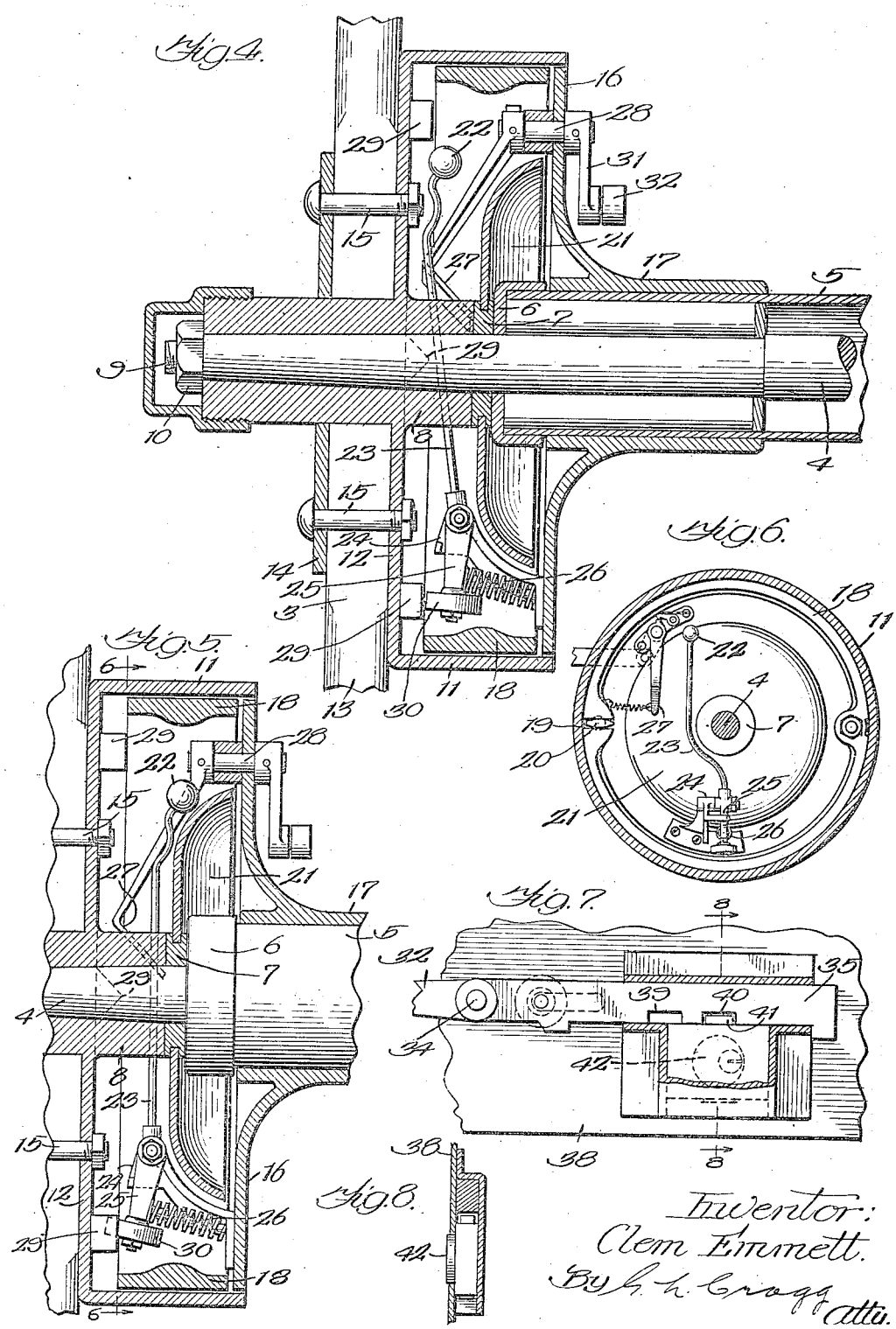

UNITED STATES PATENT OFFICE.

CLEM EMMETT, OF CHICAGO, ILLINOIS.

AUTOMOBILE.

1,294,431.  Specification of Letters Patent.  Patented Feb. 18, 1919.

Application filed April 2, 1918. Serial No. 226,171.

*To all whom it may concern:*

Be it known that I, CLEM EMMETT, a citizen of the United States, residing at Chicago, in the county of Cook and State of Illinois, have invented a certain new and useful Improvement in Automobiles, of which the following is a full, clear, concise, and exact description.

My invention relates to automobiles and has for its object the provision of an alarm which may be automatically operated when the automobile is set into motion to guard against the unauthorized use of the automobile.

In carrying out my invention I place the alarm device, which is preferably a gong, within a drum that is located upon the inside of one of the vehicle wheels. This drum may be a brake drum secured upon the inner side of one of the rear propelling vehicle wheels, the brake drum being very inaccessible due to its location and its construction. The sound producing portion of the alarm device is preferably non-rotatably mounted upon a non-rotating closure disk for the drum while the alarm actuating device turns with the drum. A restraining device is also desirably mounted upon the closure disk and is suitably accessible to be placed in either of two alternative positions, one preventing the operation of the alarm and the other permitting the operation of the alarm.

I will explain my invention more fully by reference to the accompanying drawings showing the preferred embodiment thereof and in which Figure 1 is a view illustrating the rear portion of an automobile equipped in accordance with my invention, partially in elevation and partially in section; Fig. 2 is a view taken mainly in section on line 2—2 of Fig. 1; Fig. 3 is a detail view of a part of the structure taken on line 3—3 of Fig. 1, parts being broken away; Fig. 4 is a view on line 4—4 of Fig. 1; Fig. 5 is a view generally similar to Fig. 4 but showing the alarm mechanism adjusted for operation; Fig. 6 is a view on line 6—6 of Fig. 5; Fig. 7 is a view looking from the rear of the locking mechanism and associate parts, the casing of the locking mechanism being illustrated in section; and Fig. 8 is a view on line 8—8 of Fig. 7.

Like parts are indicated by similar characters of reference throughout the different figures.

The automobile body 1 is supported in any usual or suitable way upon the chassis of the automobile, Fig. 1 illustrating one of the usual semi-elliptical springs 2 for supporting the rear portion of the automobile body carrying frame $1^1$ upon the rear propelling vehicle wheels of which one, 3, is shown. It is customary to drive these wheels by a shaft formed in sections that are coupled by differential gearing, the drawings illustrating a vehicle wheel 3 upon one of these shaft sections 4. Such a shaft is inclosed by a housing, a portion 5 of such housing being shown about the illustrated shaft section 4. Each portion 5 of the housing is closed at its outer end by a cap 6. A washer 7 intervenes between each cap and the hub 8 of the adjacent wheel 3. The outer end of each shaft section 4 carries a bolt 9 upon which a nut 10 is threaded to hold the wheel hub 8 and shaft section 4 in assembly, this same nut also holding the hub 8 and washer 7 in proper relation to the adjacent cap 6, it being understood that the shaft section 4 and the wheel 3 thereon rotate and that the housing 5 and its cap 6 are not rotatable. A brake drum 11 is coaxial with the wheel and the shaft section 4, this brake drum being desirably integrally formed in the same casting with the wheel hub 8. The drum which is upon the inner side of the wheel has an outer end wall 12 which forms the connection between the rim portion or peripheral wall of the drum and the hub. The wheel spokes 13 are held between the end wall 12 and the annular plate 14 by the bolts 15. A non-rotating disk 16 substantially closes the inner end of the brake drum and is formed with a central sleeve 17 by means of which the disk is fixedly mounted upon the adjacent portion 5 of the housing. Any usual or suitable braking appliance is employed in conjunction with the brake drum 11, the braking appliance illustrated including an annular brake ring 18, engageable with the peripheral wall or rim of the brake drum and which ring is disposed between the outer end wall 12 of the brake drum and the inner brake drum closure disk 16. This brake ring 18 is split at 19 to receive an elliptical brake ring expanding device 20.

The bell or gong 21 is desirably concentric or co-axial with the shaft 4, housing 5 and the brake drum and is preferably mounted in place by being permanently assembled with the washer 7 as illustrated in Figs. 4 and 5, the bell or gong being interposed between the end wall 12 of the brake drum and the brake drum closure disk 16. A clapper 22 is arranged to strike the bell and the bell may creep in its plane, owing to the mounting thereof upon the washer 7, without impairing its function. The stem 23 of the clapper is pivotally mounted upon a bracket 24. The clapper stem has a tail extension 25. A coiled spring 26 is interposed between the tail of the clapper stem and the closure disk 16, this spring exerting outward pressure upon the tail of the clapper stem to force the clapper toward the bell, Fig. 5, when the spring is free to act. A detent 27 is disposed between the closure disk 16 and the drum wall 12, this detent being provided with a shaft 28 that is rotatably or swingingly supported upon the closure disk. When the alarm is not to be operable the detent 27 engages the clapper stem 23 to hold the clapper away from the bell as indicated in Figs. 1, 2 and 4. When the detent is withdrawn the spring positions the clapper close to the bell as indicated in Figs. 5 and 6, the application of the clapper to the bell then being permitted. The clapper is intermittently applied to the bell by means of actuating elements 29 which are preferably in the nature of triangular lugs, desirably four in number, carried by and evenly distributed around the inner face of the drum wall 12. These lugs are arranged upon a circuit concentric with the wheel 3. They successively act upon the tail of the stem, being preferably engageable with a roller 30 mounted upon the tail of the stem when this roller is thrown into the zone of the lugs 29 consequent upon the withdrawal of the detent 27 from engagement with the stem of the clapper.

By the construction illustrated the clapper actuating lugs 29, moving with the wheel 3 when the automobile is traveling, rotate with respect to the clapper and its stem. When the roller 30 upon the clapper stem is projected into the zone of the clapper actuating lugs (which is done whenever the alarm is to be set to guard against the unauthorized operation of the automobile) the spring is intermittently depressed by the lugs 29 and consequently released, the clapper being struck against the bell upon each initial distention of the spring that follows the passage of each lug and being brought to rest slightly spaced apart from the bell following each impingement of said clapper upon the bell so that the clapper will not deaden the sound.

The alarm mechanism thus far described in connection with the drawings is inclosed by the brake drum, the end wall 12 of the brake drum and the brake drum closure disk and is therefore practically inaccessible to any one unrightfully seeking access thereto. Some means are provided, under the control of an authorized person, for placing the detent 27 in engagement with the stem of the clapper normally to prevent the operation of the alarm or to withdraw the detent from engagement with the clapper stem in order that the clapper may be intermittently applied to the bell if the automobile is caused to travel by an unauthorized person. In view of the inaccessible position of the brake drum the means should be rendered accessible elsewhere than at the brake drum but without danger of being unlawfully employed. In accomplishing this purpose I extend the shaft 28 through the closure disk 16 and secure a crank 31 upon the outer end of this shaft that thereby becomes a crank shaft. The crank 31 turns through only an arc of a circle in order to swing the detent 27 into and out of position. Motion is desirably imparted to the crank by means of a pitman 32 joined at one end with the crank by means of a crank pin 33. The other end of the pitman is joined by a wrist pin 34 with a bar 35 that carries a knob 36. The stem of this knob passes through a longitudinal slot 37 formed in a structural part 38 which is carried by and moves with the automobile body supporting frame $1^1$. The bar 35 is provided with tumbler receiving recesses 39 and 40 each capable of receiving a bolt 41 belonging to a key controlled lock 42. When the bolt 41 is withdrawn the bar 35 may be moved longitudinally of the automobile by manipulation of the knob 36 whereby one or the other of the recesses 39, 40 may be thrown into register with the bolt 41. When this bolt is thrown into the recess that is in register therewith the bar 35 is held and the pitman 32 is prevented from moving so that the detent may be held either in an off or an on position. The crank pin 33 and the wrist pin 34 together with the pitman 32 are desirably horizontally disposed so that the bodily vertical movement of the bar 35 with the automobile portion 38 may be permitted without interfering with the assembly of the pitman 32 with said pins. Each of these pins 33, 34 is desirably in threaded engagement with the parts that it unites, the intermediate portion of each pin being unthreaded. The pins and the parts they unite are assembled before being placed upon the automobile, it being impossible to turn these pins out of engagement with any of the parts with which they have threaded engagement owing to the unthreaded portions of the pins whereby a tamperer is prevented from disorganizing the construction. If the tamperer should succeed in braking the pitman 32 or otherwise disconnecting the pins 33, 34 a spring 43, which is anchored at one end of the detent 27 and at the other end to the pin 44 carried by the disk 16, will find opportunity to pull the detent out of engagement with the stem of the bell clapper whereby the bell clapper will be permitted to strike the bell when the automobile is set into motion to give the alarm.

In the preferred embodiment of the invention the return of the detent to normal position is prevented after the spring 43 has withdrawn it and to this end I provide a retaining dog 45 that is thrown into engagement with the lug 46 when the detent has been withdrawn to the extreme position by the spring 43. In the normal operation the lug 46 never reaches the dog 45, this result being possible only when the pins 33 and 34 are disconnected as by the breakage of the pitman 32.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An automobile including a drum secured to and located upon the inner side of one of its wheels and substantially co-axial with said wheel, said drum having an outer end wall adjacent the wheel; a shaft assembled with the wheel; a non-rotating housing surrounding the shaft; a non-rotating closure disk carried by the housing and located at the inner end of the drum; a gong located within the drum; a clapper mounted upon the closure disk; a spring for striking the clapper against the gong; lugs carried by the aforesaid end wall of the drum for intermittently engaging the clapper stem to move it against the force of said spring; and a detent within the drum and mounted upon said closure disk for preventing and permitting engagement of said lugs with the clapper and accessible for adjustment from the exterior of the drum.

2. An automobile including a drum secured to and located upon the inner side of one of its wheels and substantially co-axial with said wheel, said drum having an outer end wall adjacent the wheel; a shaft assembled with the wheel; a non-rotating housing surrounding the shaft; a non-rotating closure disk carried by the housing and located at the inner end of the drum; a gong located within the drum; a clapper mounted upon the closure disk; a spring for striking the clapper against the gong; lugs carried by the aforesaid end wall of the drum for intermittently engaging the clapper stem to move it against the force of said spring; a detent within the drum and mounted upon said closure disk for preventing and permitting engagement of said lugs with the clapper; a crank shaft supporting said detent and projecting through the closure disk; a crank connected with the crank shaft; a pitman connected with the crank; a bar connected with the pitman; and a lock for holding the pitman in alternative positions whereby the detent may be thrown into or out of detaining position.

3. An automobile including a drum secured to and located upon the inner side of one of its wheels and substantially co-axial with said wheel, said drum having an outer end wall adjacent the wheel; a shaft assembled with the wheel; a non-rotating housing surrounding the shaft; a non-rotating closure disk carried by the housing and located at the inner end of the drum; a gong located within the drum; a clapper mounted upon the closure disk; a spring for striking the clapper against the gong; clapper actuating means carried by the aforesaid end wall of the drum for intermittently engaging the clapper stem to move it against the force of said spring; and a detent within the drum and mounted upon said closure disk for preventing and permitting engagement of said clapper actuating means with the clapper and accessible for adjustment from the exterior of the drum.

4. An automobile including a drum secured to and located upon the inner side of one of its wheels and substantially co-axial with said wheel, said drum having an outer end wall adjacent the wheel; a shaft assembled with the wheel; a non-rotating housing surrounding the shaft; a non-rotating closure disk carried by the housing and located at the inner end of the drum; a gong located within the drum; a clapper mounted upon the closure disk; a spring for striking the clapper against the gong; clapper actuating means carried by the aforesaid end wall of the drum for intermittently engaging the clapper stem to move it against the force of said spring; a detent within the drum and mounted upon said closure disk for preventing and permitting engagement of said clapper actuating means with the clapper; a crank shaft supporting said detent and projecting through the closure disk; a crank connected with the crank shaft; a pitman connected with the crank; a bar connected with the pitman; and a lock for holding the pitman in alternative positions whereby the detent may be thrown into or out of detaining position.

5. An automobile including a drum secured to and located upon the inner side of one of its wheels and substantially coaxial with said wheel, said drum having an outer end wall adjacent the wheel; a shaft assembled with the wheel; a non-rotating housing surrounding the shaft; a non-rotating closure disk carried by the housing and located at the inner end of the drum;

a gong located within the drum; a clapper mounted upon the closure disk; lugs carried by the aforesaid end wall of the drum for intermittently engaging the clapper stem to operate the clapper; and a detent within the drum and mounted upon said closure disk for preventing and permitting engagement of said lugs with the clapper and accessible for adjustment from the exterior of the drum.

6. An automobile including a drum secured to and located upon the inner side of one of its wheels and substantially co-axial with said wheel, said drum having an outer end wall adjacent the wheel; a shaft assembled with the wheel; a non-rotating housing surrounding the shaft; a non-rotating closure disk carried by the housing and located at the inner end of the drum; a gong located within the drum; a clapper mounted upon the closure disk; clapper actuating means carried by the aforesaid end wall of the drum for intermittently engaging the clapper stem to operate the clapper; a detent within the drum and mounted upon said closure disk for preventing and permitting engagement of said clapper actuating means with the clapper; a crank shaft supporting said detent and projecting through the closure disk; a crank connected with the crank shaft; a pitman connected with the crank; a bar connected with the pitman; and a lock for holding the pitman in alternative positions whereby the detent may be thrown into or out of detaining position.

7. An automobile including a drum secured to and located upon the inner side of one of its wheels and substantially co-axial with said wheel; alarm mechanism within the drum and operable by the drum; and adjustable detaining means for preventing and permitting the operation of the alarm mechanism.

8. An automobile in combination with an alarm mechanism operable by a moving part of the automobile; a lock controlling the operativeness of the alarm mechanism; and means for automatically setting the alarm mechanism to enable it to be operated by said moving part of the automobile upon breakage of locking connection between the lock and the alarm mechanism.

In witness whereof I hereunto subscribe my name this 29th day of March, A. D. 1918.

CLEM EMMETT.

Copies of this patent may be obtained for five cents each, by addressing the "Commissioner of Patents, Washington, D. C."